United States Patent [19]

Spillman, Jr.

[11] Patent Number: 4,709,145
[45] Date of Patent: Nov. 24, 1987

[54] METHOD AND APPARATUS FOR COMPENSATING FIBER OPTIC LEAD AND CONNECTOR LOSSES IN A FIBER OPTIC SENSOR BY USING A DUAL WAVELENGTH OPTICAL SOURCE AND MATCHED POLARIZER

[75] Inventor: William B. Spillman, Jr., Charlotte, Vt.

[73] Assignee: Simmonds Precision Products, Inc., Tarrytown, N.Y.

[21] Appl. No.: 898,317

[22] Filed: Aug. 20, 1986

[51] Int. Cl.[4] .................................................. H01J 5/16
[52] U.S. Cl. .................................... 250/227; 250/225; 250/231 R; 250/231 P; 73/800
[58] Field of Search ................ 250/225, 227, 231 R, 250/231 P; 324/96; 73/705, 800; 350/96.29

[56] References Cited

U.S. PATENT DOCUMENTS

| 4,249,264 | 2/1981 | Crochet et al. | 455/612 |
| 4,290,146 | 9/1981 | Adolfsson et al. | |
| 4,368,645 | 10/1983 | Glenn et al. | 73/750 |
| 4,442,350 | 7/1984 | Rashleigh | 250/227 |
| 4,493,995 | 1/1985 | Adolfsson et al. | 250/227 |
| 4,515,473 | 5/1985 | Mermelstein | 356/33 |
| 4,519,252 | 3/1985 | McMahon | |
| 4,523,092 | 6/1982 | Nelson | 250/231 R |
| 4,564,289 | 1/1986 | Spillman | 73/705 |
| 4,629,323 | 12/1986 | Matsumoto | 250/227 T |
| 4,642,458 | 2/1987 | Jackson et al. | 250/227 T |

OTHER PUBLICATIONS

"Multimode Fiber Optic Sensors Based on the Photoelastic Effect", Spillman and McMahon,—1983.
"Spectral Linewidth Dependence of Photoelastic Sensor Performance", Spillman, Patriquin and Kline—1985.

Primary Examiner—Edward P. Westin
Assistant Examiner—Jessica L. Rooff
Attorney, Agent, or Firm—Cushman, Darby & Cushman

[57] ABSTRACT

Apparatus and method for compensating a photo sensor for fiber optic cable lead/connector losses and optical source power fluctuations includes a specially selected broadband optical source used in conjunction with a photoelastic fiber optic transducer that uses a polarizer and an analyzer that only polarize a portion of the broadband signal. The portion of the signal that is not polarized is simply transmitted through the photoelastic element and emerges with no modulation. The portion of the signal that is polarized is modulated according to the stress on the photoelastic element. After transmitting the output light beam through a single fiber optic cable, the beam is separated into two parts. The first part is filtered so as to transmit only that portion of the broadband signal that is not affected by the polarizer and analyzer and hence is not modulated. The filtered first part is converted to an electrical signal by a photo detector. The second part of the split beam is filtered so as to transmit only that portion of the broadband signal that is affected by the polarizer and analyzer, and hence is modulated. The filtered second part is converted to an electrical signal by a second photo detector. The second signal varies according to lead and connector losses and the stress modulation on the photoelastic element. The first signal varies according to lead and connector losses only. The ratio of the second signal to the first signal then provides a measure of the changes in the transmission due to the modulation of the transducer element, without lead and connector losses, or variations due to power source fluctuations.

26 Claims, 8 Drawing Figures

METHOD AND APPARATUS FOR COMPENSATING FIBER OPTIC LEAD AND CONNECTOR LOSSES IN A FIBER OPTIC SENSOR BY USING A DUAL WAVELENGTH OPTICAL SOURCE AND MATCHED POLARIZER

BACKGROUND OF THE INVENTION

This invention relates to the field of lead loss compensation for fiber optic sensors, and more particularly to a dual wavelength technique for compensating losses caused by phenomenon other than the sensed condition.

With the rapid growth of fiber optic-based communications, increasing attention is being paid to the use of fiber optic sensors for detecting such phenomena as acoustic waves, rotation rates, acceleration, pressure, magnetic and electric fields, temperature, stress and strain, etc. Such fiber optic sensors are normally based on a transducer mechanism that depends upon modification of the polarization of light passing through the sensor. Thus, the polarization of the light beam is modulated in accordance with the sensed phenomenon. A typical configuration for such a sensor includes a light source for providing a light beam, fiber optic cables for transmitting the light beam, a photo transducer which modulates the light beam in accordance with the externally applied phenomenon, additional fiber optic cables for transmitting the modulated light beam to photo detectors where the modulation of the light beam may be decoded, and a processor which outputs a usable signal indicating the magnitude of the sensed phenomenon.

A significant drawback to the typical photo sensor configuration is that losses caused by signal attenuation in the fiber optic cables and their connectors is significant compared to the signal level of the light beam. In addition, power fluctuations in the light source itself also may overshadow the signal level detected by the photo detectors. Turning to FIG. 1, it can be seen that the intensity of the signal detected by the photo detectors may be hidden by fiber optic lead and connector losses. FIG. 1 is directed to a photo transducer which detects stress. The X axis depicts increasing amounts of stress applied to the photo transducer, while the Y axis depicts the intensity of the optical signal detected by the photo detectors. Assuming that the detected optical power is $I_s$, it is uncertain whether the stress applied to the photo transducer is $S_1$, $S_2$, or $S_3$. The stress is highly dependent upon the lead/connector losses of the fiber optic cable system. Such losses are inherent in any fiber optic photo sensor device employing fiber optic cables, and these losses severely restrict the potential applications for such a device. Even where such a device may be applied, the accuracy of the measured optical signal is highly suspect.

One solution to this problem would be to calibrate the lead/connector losses before each measurement. This solution would provide minimal improvement since such lead/connector losses can vary over time. In addition, such a calibration scheme would fail to compensate the detected signal for power fluctuations in the light source itself. In addition, such constant recalibration would consume a great deal of time for the minimal benefits achieved thereby. Therefore, a more precise solution to this problem must be achieved before fiber optic sensing systems achieve wide acceptability in the sensor field.

One such solution is proposed in U.S. Pat. No. 4,368,645 to Glenn et al. Glenn et al discloses an optical pressure sensor which can compensate for some (but not all) lead/connector losses and light source power fluctuations. The device according to Glenn et al provides a light source which generates a light beam that is input into a fiber optic cable. The fiber optic cable directs the source light beam to a lens which collimates the light beam. The collimated light beam is then passed through a linear polarizer and a quarter wave plate to circularly polarize the collimated light beam. The circularly polarized light beam is then introduced into a photoelastic transducer which modulates the polarized light beam in accordance with pressure applied to the photoelastic transducer. The modulated light beam is then directed to a polarizing beam splitter which splits the modulated light beam into first and second components. Each separate component is focused by a lens into a separate fiber optic cable. These fiber optic cables then direct the first and second components to photo detector devices for detecting the intensity of the first and second components. The dependence of the intensities of the two components on the pressure applied to the photoelastic transducer permits the measurement of that pressure in a manner that has quadratic error dependence on optical misalignment. The difference in the intensities of the two components is then divided by the sum of the intensities of the two components to eliminate lead/connector losses in the fiber optic cable leading up to the transducer. However, such a scheme does nothing to compensate for transmission losses from the output of the transducer to the photo detector devices. Thus, the device according to Glenn et al is still highly susceptible to fiber optic lead/connector losses. If such losses in the output fiber optic cables are significant, the device according to Glenn et al will not function properly.

Another solution for compensating the sensitivity variations in fiber optic cables and the drift of the light source and photo detectors is proposed in U.S. Pat. No. 4,493,995 to Adolfsson et al. In Adolffson et al, an optical source provides a source light beam at a single wavelength which is used as a carrier wave. This carrier wave is then modulated at one or more lower frequencies in accordance with the phenomenon sensed by the photo transducer. The material in the photo transducer responds differently depending upon the modulation frequency of the light beam, not upon the carrier frequency (wavelength) itself. The response of the photo transducer material at the different modulation frequencies can then be used to determine the sensed phenomenon independently of lead and connector losses. However, such a device is complex and expensive due to the necessity of modulating the carrier wave. In addition, demodulation electronics are required, also increasing the complexity and cost of this device.

Therefore, what is needed is an inexpensive yet precise solution to compensating photo sensor systems for fiber optic lead/connector losses and power fluctuations in the light source.

SUMMARY OF THE INVENTION

The present invention provides an inexpensive, easy-to-assemble, yet precise solution to the problems of fiber optic lead/connector losses, and power fluctuations in the light source in an optical measuring system.

The present invention provides method and apparatus in which an optical source provides a source light beam having at least first and second spectral components. Each spectral component has at least one associated wavelength. Such a source light beam may be provided by a single broadband light source, or two separate light sources operating at different wavelengths.

A polarization-optical-transducer device then receives the source light beam and modulates it according to a detected phenomenon. This device may include a polarizer, a photoelastic transducer, and an analyzer. The polarizer receives the source light beam and is specially selected so that the first spectral component of the source light beam is polarized while the second spectral component of the source light beam is effectively unpolarized. The light beam is then directed to the photoelastic transducer which modulates the polarized first component in accordance with the detected phenomenon. The unpolarized second spectral component remains effectively unmodulated by the transducer. The light beam is then passed through the analyzer which converts the polarization modulations into light intensity modulations. Thus, the analyzer provides an output light beam having modulated and unmodulated light intensity components. This output light beam is then transmitted away from the transducer device by a single fiber optic cable.

The output light beam is then directed to a beam splitter which splits the output light beam into first and second portions, each portion including the modulated and unmodulated light intensity components. The first portion is passed through a narrow passband filter which only passes the modulated light intensity components. These modulated light intensity components vary in accordance with the detected phenomenon and can be detected by a first photo detector. The second portion of the split beam is passed through a second filter which filters out the modulated light intensity components while passing the unmodulated components. The unmodulated components remain substantially unresponsive to variations in the detected phenomenon. The intensity of the unmodulated components is then detected with a second photo detector.

Output signals from both photo detectors are then provided to a processing device which thus receives a first electrical signal which varies in accordance with the detected phenomenon, and a second electrical signal which does not vary in accordance with the detected phenomenon. The processing device then provides a ratio of the first and second electrical signals, such ratio varying in accordance with the detected phenomenon, but without the effects of fiber optic lead/connector losses and drift of the light source.

It can be seen that such a device and method is inexpensive since the device is comprised of off-the-shelf components. Such a device and method also completely compensate for fiber optic lead/connector losses in the fiber optic cables leading to and away from the photoelastic transducer.

BRIEF DESCRIPTION OF THE DRAWINGS

The features and advantages of the present invention will be more clearly understood with reference to the following detailed description of the presently preferred exemplary embodiment taken together with the attached drawings which show.

DETAILED DESCRIPTION OF THE PRESENTLY PREFERRED EXEMPLARY EMBODIMENT

Briefly, the invention provides apparatus and method for use with fiber optic sensors based upon transducer mechanisms that depend upon polarization modulation of a source light beam. The essence of the technique is to employ two optical sources (or a single broadband optical source) to inject a light beam through the optical fiber and transducer, and also to use polarization optics that only function as polarizers at one of the wavelengths while being effectively non-polarizing at the other wavelength. Changes in the transmission characteristics of the fibers will affect both wavelengths equally, while the polarization transducer mechanism will only affect one of the wavelengths. The ratio of the signals of the two wavelengths will then vary due to the transducer mechanism, but will be relatively insensitive to losses in the fiber optic leads and connectors and optical source drift.

The present invention is one solution to the problem of compensating an optical measuring system for fiber optic lead/connector losses. Another solution is proposed in my co-pending application Ser. No. 898,318, filed concurrently herewith and entitled METHOD AND APPARATUS FOR COMPENSATING FIBER OPTIC LEAD AND CONNECTOR LOSSES IN A FIBER OPTIC SENSOR BY USING A BROADBAND SOURCE AND MULTIPLE WAVE RETARDATION.

The present invention makes use of the photoelastic effect in order to provide an optical transducer responsive to a detected phenomenon. Photoelastic transducers may be used to measure such phenomenon as acoustic waves, rotation rates, acceleration, pressure, magnetic and electric fields, temperature, and stress and strain, etc. While the present invention will be described with reference to examples depicting pressure and stress sensing devices, it is to be understood that the teachings of this invention are applicable to an optical measuring device for measuring any phenomenon capable of being detected with an optical transducer.

Generally, the photoelastic transducer and its operation are known in the field and are more fully described in an article entitled "Multimode Fiber Optic Sensors Based On The Photoelastic Effect", written by the inventor, and D. H. McMahon. This article was presented at the SPIE Technical Symposium East, in Arlington, Va. during April of 1983. The teachings of this article are incorporated into this application by reference.

Photoelasticity is a phenomenon of stress (or strain) induced birefringence in optically transparent materials. Many of these materials are isotropic in the unstressed case. When a uniaxial stress is applied, however, a difference in index of refraction is introduced between the stress direction and directions orthogonal thereto. The materials, therefore, exhibit a birefringence that depends upon applied stress.

Figure 2:
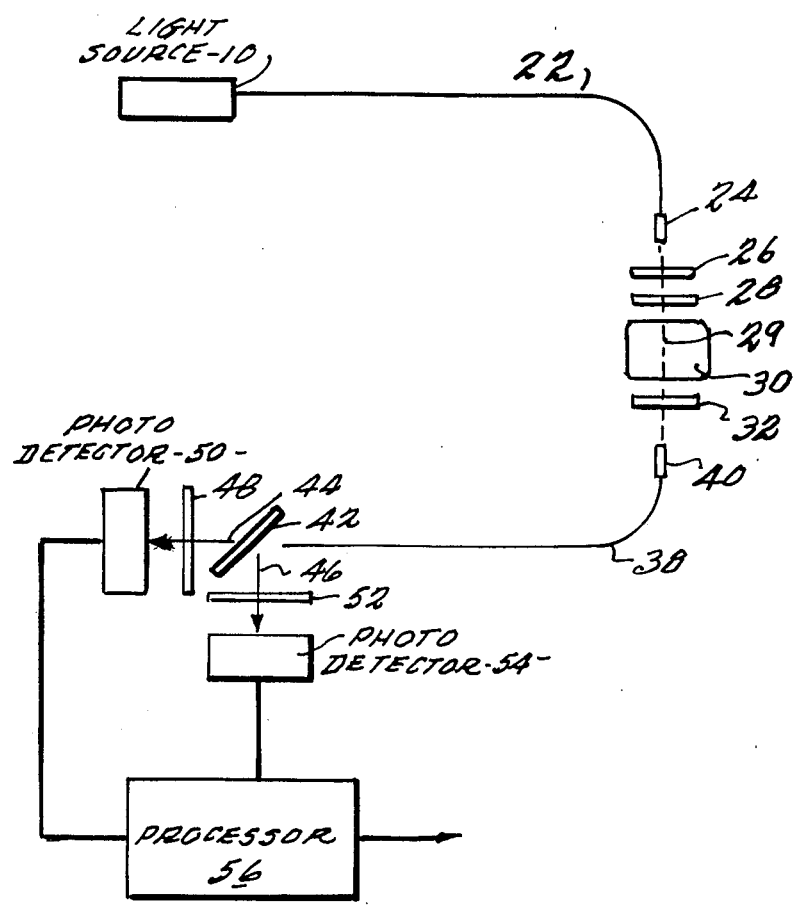
FIG. 2 depicts the apparatus according to the presently preferred exemplary embodiment.
Figure 3:
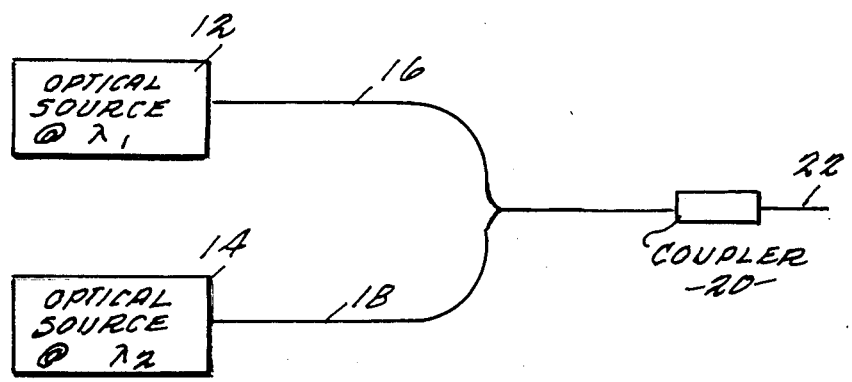
FIG. 3 depicts an alternative optical source.

FIG. 2 depicts one exemplary embodiment of the present invention. A broadband light source 10 provides a source light beam having at least first and second spectral components. Each spectral component has at least one wavelength which is different from the wavelengths of the other spectral components. As an alternative to the single broadband optical source, two optical sources 12 and 14 may be provided, see FIG. 3. Optical source 12 provides a first source light beam having a spectral component with an associated wavelength. Light source 14 provides a second source light beam having a second spectral component with a wavelength different than the wavelength of the first optical source. The first and second source light beams are then provided through fiber optic cables 16 and 18 to a coupler 20 which provides a single source light beam containing both spectral components to fiber optic cable 22.

The source light beam then travels through fiber optic cable 22 to polarizer 26. It is to be understood that fiber optic cable 22 may actually include a number of fiber optical cables linked together by fiber optic connectors 24. The number of fiber optic cables 22 and fiber optic connectors 24 will vary depending upon the application for which the optical sensor system is designed.

Figure 4A:
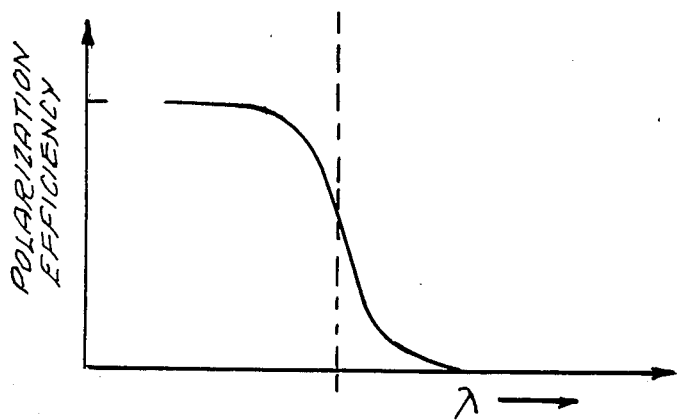
FIGS. 4a and 4b are two graphs showing the source optical power and the polarization efficiency of the polarizer as functions of wavelength.
Figure 4B:
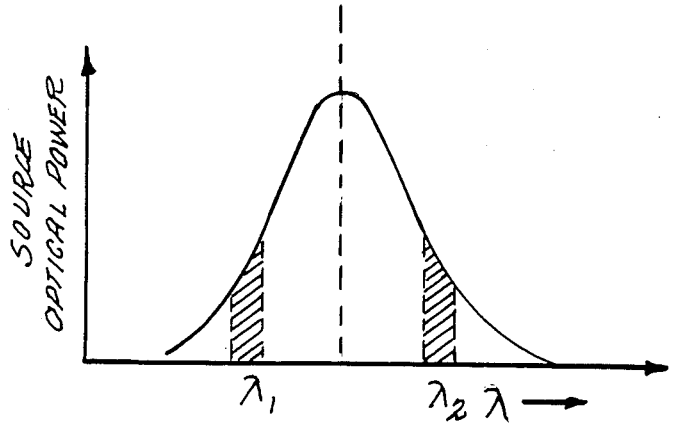

The source light beam is then projected from the fiber optic cable 22 to a polarizer 26. The polarizer 26 is a specially constructed polarizer which polarizes only one of the spectral components of the source light beam while leaving the other spectral component effectively unpolarized, see FIG. 4a. Such a polarizer may be a plastic polarizer specially chosen depending upon the wavelengths of the first and second spectral components. For example, where the first wavelength is chosen as lying between 560 and 700 nanometers, a linear polarizing plastic polarizer provides a very good extinction ratio. On the other hand, where the second wavelength is chosen as being greater than 800 nanometers, the linear polarizing plastic polarizer provides no extinction. In addition, the two spectral components of interest in the optical source light beam must be matched to the polarizer to ensure that one spectral component is polarized while the other spectral component is not, see FIG. 4b. Thus, a careful choice of optical sources and polarizers must be made in order to provide a first spectral component which varies in accordance with the detected phenomenon, while a second spectral component does not vary in accordance with the detected phenomenon (see FIGS. 4a and 4b).

Polarizer 26 may be placed so that it is generally orthogonal to the optical axis 29 of the source light beam. If the source light beam is defined at lying along the Z axis, the polarizer 26 lies in the X-Y plane. Superimposing the X and Y axes on the X-Y plane, the transmission axis of the polarizer may be disposed at $\pi/4$ with respect to the X axis. Thus, the first spectral component is polarized while the second spectral component remains effectively unpolarized. An addition to the present invention may include a quarter wave plate 28 disposed between polarizer 26 and photo transducer 30. Quarter wave plate 28 may be used to bias the linearly polarized light beam passing through polarizer 26.

The polarized light beam then enters photoelastic transducer 30. The photoelastic transducer is disposed so that pressure (or another phenomenon of interest) impinges upon the photoelastic material in a direction orthogonal to the optical axis. For example, the pressure may be applied along the X-axis. The photoelastic transducer then acts to further polarize (modulate) the polarized component of the light beam in accordance with the pressure applied to the transducer. The unpolarized component of the light beam remains effectively unmodulated by the photo transducer.

The light beam emerging from the photoelastic transducer is then directed along its optical axis to an analyzer 32. Analyzer 32 may be a polarizer having its transmission axis displaced by $-\pi/4$ with respect to the X-axis. The analyzer acts to convert the polarized components of the light beam into light intensity components. The light beam output from the analyzer thus contains spectral components whose light intensity varies in accordance with the pressure applied to the photoelastic transducer, and spectral components whose light intensity does not vary with the pressure applied to the transducer.

Figure 5:
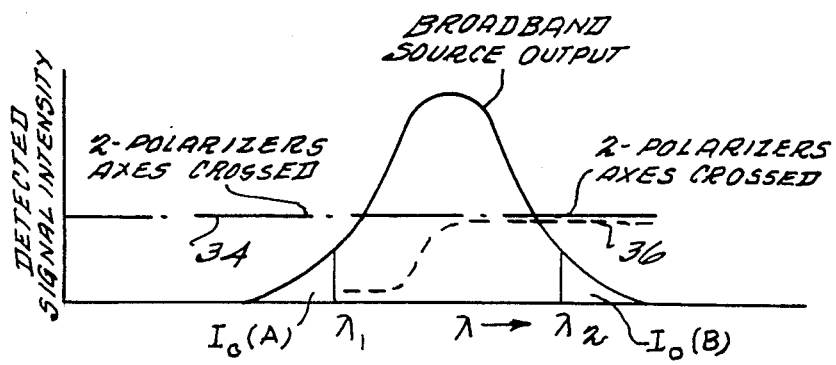
FIG. 5 depicts the effect on the intensity of the detected signal of cross-polarizing the polarizer and analyzer.

Polarizer 26 and analyzer 32 thus function as cross-polarizers and are specially selected so that they only function as polarizers in a given wavelength region. The optical source (a single broadband source or two individual light sources) is specifically chosen to have a spectral output both within and without the wavelength region over which the polarizer and analyzer function. FIG. 5 depicts this relationship. FIG. 5 uses a typical output for a Polaroid TM polarizing film, for example. FIG. 5 assumes a single broadband optical source having spectral components having wavelengths $\lambda_1$ and $\lambda_2$. The spectral output from the broadband source is shown. Horizontal line 34 depicts the spectral dependence of optical power transmitted through a polarizer/analyzer pair where their transmission axes are parallel. Curve 36 depicts the spectral dependence of optical power transmitted through a polarizer/analyzer pair where their transmission axes are crossed. In this case, the spectral component containing wavelength $\lambda_1$ is not transmitted by the polarizer/analyzer pair thereby demonstrating the effectiveness of the polaroid film at this wavelength. Thus, it can be seen that the light intensity $I_0(A)$ of the first spectral component will vary in response to the pressure applied to photo transducer 30. However, dotted line 36 shows that the light intensity $I_0(B)$ of the second spectral component containing wavelength $\lambda_2$ remains relatively unresponsive to the pressure applied to the photo transducer 30.

Figure 1:
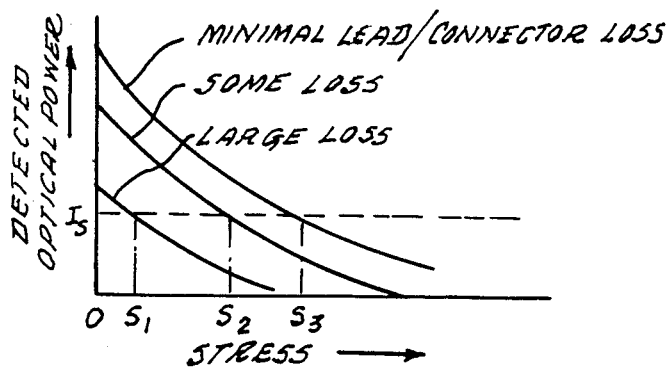
FIG. 1 is a stress versus detected optical power graph illustrating the disadvantages of fiber optic lead/connector loss on the detected signal intensity.
Figure 6:
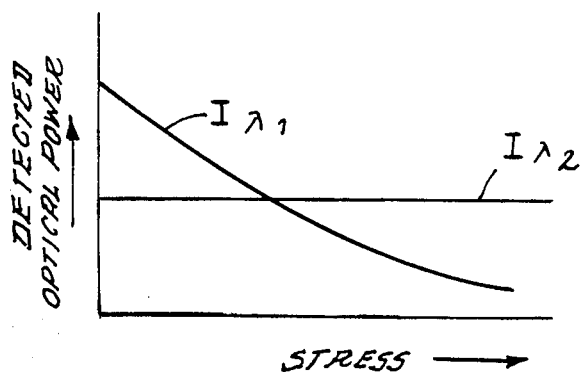
FIG. 6 depicts the detected optical power of the first and second components as they vary with stress.

FIG. 6 depicts the interrelationship of the light intensity of the first spectral component containing $\lambda_1$ with the light intensity of the second spectral component containing $\lambda_2$. It can be seen that the light intensity of wavelength $\lambda_1$ varies in accordance with the stress or pressure applied to photo transducer 30, whereas the light intensity according to wavelength $\lambda_2$ remains invariant to such pressure. The present invention makes use of this relationship in order to provide an output signal whose response is relatively independent of fiber optic lead/connector losses and power fluctuations in the light source.

Returning to FIG. 2, the light beam exiting analyzer 32 is injected into a single fiber optic cable 38. This output light beam contains light intensities corresponding to the first and second spectral components, as depicted in FIG. 6.

Fiber optic cable 38 may include a plurality of cables coupled together using connectors 40.

The output light beam is directed from fiber optic cable 38 to beam-splitter 42. Beam-splitter 42 splits the output light beam into first and second portions. First portion 44 is directed to a narrow passband filter 48 which filters out the light intensity components which do not vary in accordance with the pressure applied to photo transducer 30. Photo detector 50 thus detects a light intensity which varies in accordance with the pressure applied to the photo transducer 30.

The second portion 46 of the split beam is directed to a filter 52 which filters out the light intensity components that vary with the pressure applied to the photo transducer 30, leaving those light intensity components which remain substantially invariant to the pressure applied to photo transducer 30. Photo detector 54 thus detects light intensity components which are not responsive to the pressure applied in photo transducer 30. Thus, photo detector 50 detects light intensity components which vary in accordance with the applied pressure, and in accordance with transmission losses in the fiber optic cables and connectors and also power fluctuations in light source 10. On the other hand, photo detector 54 detects light intensity components which vary only in accordance with transmission losses and power fluctuations. Both photo detectors 50 and 54 provide electrical output signals to processor 56 corresponding to the light intensities detected by each photo detector.

Figure 7:
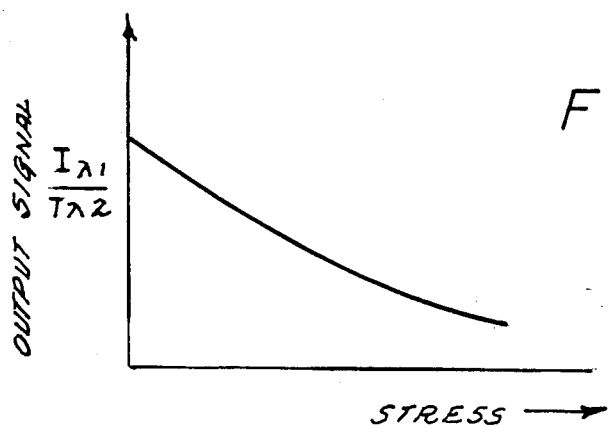
FIG. 7 shows that the ratio of the detected optical power of the first and second components varies with stress independent of lead/coupler losses.

The electrical signals from photo detectors 50 and 54 are provided to processor 56 which provides an electrical output signal that is proportional to the ratio of the optical intensities affected and unaffected by the photo transducer 30. This ratio is then insensitive to changes in optical intensity due to non-transduer effects. The signal output by processor 56 is depicted in FIG. 7. As shown therein, the output signal varies with the stress applied to the photo transducer and is independent of lead/coupler losses, or losses due to the drift in the optical source.

In sum, even though photo transducer 30 acts on the polarization state of all light passing through it, this change will not appear as an intensity fluctuation unless its polarization state is analyzed by a polarizing element 32. As shown in FIG. 6, the light intensity $I_{\lambda 2}$ does not change with variations of the detected phenomenon due to the fact that the portion of the broadband optical source that is transmitted through the narrow passband filter 52 is not affected by polarizer 26 and analyzer 32 (i.e. it is some fraction of the optical power $I_0(B)$ shown in FIG. 4). The detected intensity signal $I_{\lambda 1}$ does change with the variation of the detected phenomenon due to the fact that the portion of the broadband source output that is transmitted through filter 48 is affected by the polarizer 26 and the analyzer 32 (i.e. it is some fraction of the optical power $I_0(A)$ that is a function of the detected phenomenon shown in FIG. 5).

Thus, the technique according to the present invention is based upon an optical source which is carefully selected to have spectral components which straddle the wavelength region of the effectiveness of the polarizer 26 and analyzer 32. Narrow band filtering of the optical signal allows both reference and transducer-varying output to be detected simultaneously.

Thus, what has been described are apparatus and method for precisely sensing a phenomenon of interest without incurring losses due to signal attenuation by fiber optic cables and connectors, and by fluctuations in the optical source.

While the invention has been described in connection with what is presently considered to be the most practical and preferred embodiments, it is to be understood that this invention is not limited to the disclosed embodiment, but, on the contrary, is intended to cover various modifications and equivalent arrangements included within the spirit and scope of the appended claims. It is to be understood that all such equivalent structures are to be included within the scope of the following claims:

I claim:

1. Optical sensor apparatus, comprising:
   means for providing a source light beam including a first component having a first wavelength and a second component having a second wavelength;
   polarizer means for receiving said source light beam, and for polarizing said first component while leaving said second component substantially unpolarized, and for providing a light beam having polarized and unpolarized components;
   optical transducer means for receiving said light beam from said polarizer means, and for modulating said polarized component in response to an externally applied condition while leaving said unpolarized component substantially unmodulated, and for providing an output light beam having modulated and unmodulated components;
   analyzer means for receiving said output light beam from said optical transducer means, and for providing an analyzed light beam having a plurality of modulated and unmodulated intensities corresponding to said modulated and unmodulated components, respectively;
   a single first light guiding means for transmitting said analyzed light beam;
   beam splitter means for receiving said analyzed light beam from said single first light guiding means, and for splitting said analyzed light beam into first and second portions, each portion including said modulated and said unmodulated light intensities;
   first filter means for receiving said first portion, and for transmitting said modulated light intensity while substantially blocking said unmodulated light intensity, and for providing a first filtered light beam having said modulated light intensity;
   second filter means for receiving said second portion, and for transmitting said unmodulated light intensity while substantially blocking said modulated light intensity, and for providing a second filtered light beam having said unmodulated light intensity;
   first photo detector means for receiving said first filtered light beam, and for providing a first signal corresponding to an intensity of said first filtered light beam;
   second photo detector means for receiving said second filtered light beam, and for providing a second signal corresponding to an intensity of said second filtered light beam; and
   ratio means for receiving said first and second signals, and for providing an output signal corresponding to a ratio of said first signal to said second signal.

2. Apparatus according to claim 1 wherein said means for providing a source light beam includes a single light source providing a broadband beam of light encompassing said first and second wavelengths.

3. Apparatus according to claim 1 wherein said means for providing a source light beam includes a first light source providing a first light beam having said first wavelength, and a second light source providing a second light beam having said second wavelength, and further including an optical coupler for coupling said first and second light beams to provide said source light beam.

4. Apparatus according to claim 1 further including a single second light guiding means for transmitting said source light beam from said means for providing a source light beam to said polarizer means.

5. Apparatus according to claim 4 wherein said first and second light guiding means comprise fiber optic cables.

6. Apparatus according to claim 1 wherein said polarizer means and said analyzer means polarize only in a predetermined wavelength region, and wherein said means for providing a source light beam includes a broadband optical source having a spectral output which lies inside and outside of said predetermined wavelength region.

7. Optical sensor apparatus, comprising:
optical source means for providing a source light beam having first and second components of first and second wavelengths, respectively;
polarization optical transfer means for (a) receiving said source light beam from said optical source means, (b) polarizing said source light beam to cause said first component to be polarized while leaving said second component effectively unpolarized, (c) modulating said first component in accordance with an external condition applied to said transducer means while leaving said second component effectively unmodulated, and (d) providing an output light beam having modulated and unmodulated components;
a single first light guiding means for transmitting said output light beam from said polarization optical transducer means;
filter means for (a) receiving said output light beam from said single first light guiding means, (b) providing a first filtered optical signal having said modulated components and being effectively free of said unmodulated components, and (c) providing a second filtered optical signal having said unmodulated components and being effectively free of said modulated components;
photo detector means for (a) receiving said first and second filtered optical signals, (b) converting said optical signals into electrical signals, (c) providing a first electrical signal corresponding to an intensity of said first filtered optical signal, and (d) providing a second electrical signal corresponding to an intensity of said second filtered optical signal; and
processing means for receiving said first and second electrical signals and providing an output signal corresponding to a ratio of said first and second electrical signals.

8. Apparatus according to claim 7 wherein said optical source means includes:
first optical source means for providing a first source light beam having said first wavelength;
second optical source means for providing a second source light beam having said second wavelength; and
coupling means for coupling said first and second source light beams to form said source light beam.

9. Apparatus according to claim 7 wherein said optical source means includes a single broadband optical source which provides said source light beam having a broadband of wavelengths including said first and second wavelengths.

10. Apparatus according to claim 7 wherein said polarization optical transducer means includes:
a first polarizer receiving said source light beam;
a photoelastic transducer optically coupled to said first polarizer; and
a second polarizer optically coupled between said photoelastic transducer and said single first light guiding means.

11. Apparatus according to claim 10 further including a quarter wave plate optically coupled between said first polarizer and said photoelastic transducer.

12. Apparatus according to claim 7 wherein said filter means includes:
beam splitter means for receiving said output light beam from said single first light guiding means, and for splitting said output light beam into first and second portions, each portion including said modulated and said unmodulated components;
first filter means for (a) receiving said first portion from said beam splitter means, (b) passing said first portion modulated components, (c) substantially blocking said first portion unmodulated components, and (d) providing said first filtered optical signal; and
second filter means for (a) receiving said second portion from said beam splitter means, (b) passing said second portion unmodulated components, (c) substantially blocking said second portion modulated components, and (d) providing said second filtered optical signal.

13. Apparatus according to claim 12 wherein said photo detector means includes:
first photo detector means for receiving said first filtered optical signal from said first filter means, and for providing said first electrical signal; and
second photo detector means for receiving said second filtered optical signal from said second filter means, and for providing said second electrical signal.

14. Apparatus according to claim 7 wherein said optical source means provides said source light beam wherein said first wavelength is between approximately 550 nanometers and approximately 700 nanometers, and wherein said second wavelength is greater than approximately 800 nanometers.

15. Apparatus according to claim 7 further including a single second light guiding means for carrying said source light beam from said optical source means to said polarization optical transducer means.

16. Apparatus according to claim 7 wherein said filter means includes first and second dichroic filter means for providing said first and second filtered optical signals, respectively.

17. Apparatus according to claim 7 wherein said polarization optical transducer means includes a photoelastic fiber optic transducer which modulates said first component in accordance with externally applied pressure.

18. Optical sensor apparatus, comprising:
means for providing a source light beam having first and second wavelengths;
first light channel means for directing said source light beam;
polarizer means for receiving said source light beam from said first light channel means, and for polarizing said source light beam at said first wavelength but leaving said source light beam at said second wavelength substantially unpolarized;
optical transducer means for receiving said polarized light and said unpolarized light, and for modulating said polarized light in response to an externally applied condition while leaving said unpolarized light substantially unmodulated;
a single second light channel means for directing said modulated light and said unmodulated light;
beam splitter means for splitting the directed modulated light and unmodulated light into first and second light beams, each including said modulated and said unmodulated light;
first filter means for receiving said first light beam, and for transmitting said modulated light while substantially blocking said unmodulated light;
second filter means for receiving said second light beam, and for transmitting said unmodulated light while substantially blocking said modulated light;
first photo detector means for receiving said modulated light from said first filter means, and for providing a first output signal corresponding to an intensity of said modulated light;
second photo detector means for receiving said unmodulated light from said second filter means, and for providing a second output signal corresponding to an intensity of said unmodulated light; and
ratio means for receiving said first and second output signals from said first and second photo detector means, respectively, and for providing an electric signal corresponding to a ratio of said first output signal and said second output signal.

19. A method of sensing, comprising the steps of:
providing a source light beam having first and second components, said first component having a first wavelength and said second component having a second wavelength;
polarizing said source light beam to cause said first component to be polarized while leaving said second component substantially unpolarized;
modulating, with an optical transducer, said first component in accordance with an external condition applied to said optical transducer while leaving said second component substantially unmodulated to provide an output light beam having modulated and unmodulated components;
transmitting, with a single light guiding channel, said output light beam from said optical transducer;
filtering said output light beam from said single light guiding channel to provide (a) a first filtered optical signal which has said modulated components but is substantially free of said unmodulated components, and (b) a second filtered optical signal which has said unmodulated components but is substantially free of said modulated components;
detecting said first and second filtered optical signals and providing (a) a first electrical signal corresponding to an intensity of said first filtered optical signal, and (b) a second electrical signal corresponding to an intensity of said second filtered optical signal; and
processing said first and second electrical signals to provide an output signal corresponding to a ratio of said first and second electrical signals.

20. A method according to claim 19 wherein said step of providing a source light beam includes the step of providing said source light beam with a broadband of wavelengths including said first and second wavelengths.

21. A method according to claim 19 wherein said step of providing a source light beam includes the steps of:
providing a first source light beam having said first wavelength;
providing a second source light beam having said second wavelength; and
coupling said first and second source light beams to provide said source light beam.

22. A method according to claim 19 wherein said filtering step includes the steps of:
splitting said output light beam to provide first and second beam portions, each portion having said modulated and said unmodulated components;
filtering said first portion to provide said first filtered optical signal; and
filtering said second portion to provide said second filtered optical signal.

23. A method according to claim 22 wherein said detecting step includes the steps of:
detecting, with a first photo detector, said first filtered optical signal to provide said first electrical signal; and
detecting, with a second photo detector, said second filtered optical signal to provide said second electrical signal.

24. A method according to claim 19 wherein said step of providing a source light beam includes the step of providing said source light beam wherein said first wavelength is between approximately 550 nanometers and approximately 700 nanometers, and wherein said second wavelength is greater than approximately 800 nanometers.

25. A method according to claim 19 further including the step of transmitting, with at least a fiber optical cable, said source light beam.

26. A method of optically sensing pressure, comprising the steps of:
generating a source light beam having a first component with a first wavelength and a second component with a second wavelength;
transmitting, with at least a first fiber optic cable, said source light beam;
polarizing the transmitted source light beam to cause said first component to be polarized while leaving said second component effectively unpolarized;
detecting, with a photoelectric transducer, said pressure;
modulating, with said transducer, the polarized first component while leaving the unpolarized second component effectively unmodulated to provide an output light beam having modulated and unmodulated components;
transmitting, with a single second fiber optic cable, said output light beam;
splitting the transmitted output light beam into first and second portions, each portion having said modulated and said unmodulated components;

filtering said first portion to pass said first portion modulated components while substantially blocking said first portion unmodulated components;

filtering said second portion to pass said second portion unmodulated components while substantially blocking said second portion modulated component;

detecting said first portion modulated components and providing a first electrical signal corresponding thereto;

detecting said second portion unmodulated components and providing a second electrical signal corresponding thereto; and receiving said first and second electrical signals and providing an output signal corresponding to a ratio of said first and second electrical signals.

* * * * *

UNITED STATES PATENT AND TRADEMARK OFFICE
CERTIFICATE OF CORRECTION

PATENT NO. : 4,709,145

DATED : November 24, 1987

INVENTOR(S) : William B. Spillman, Jr.

It is certified that error appears in the above-identified patent and that said Letters Patent is hereby corrected as shown below:

Column 9 - Line 30   " transfer "

should read      -- transducer --

Signed and Sealed this

Twenty-fourth Day of May, 1988

Attest:

Attesting Officer

DONALD J. QUIGG

Commissioner of Patents and Trademarks